Jan. 19, 1965    N. LJUNGMAN ETAL    3,166,732
VEHICULAR PARKING SYSTEMS
Filed Aug. 22, 1962    5 Sheets-Sheet 3

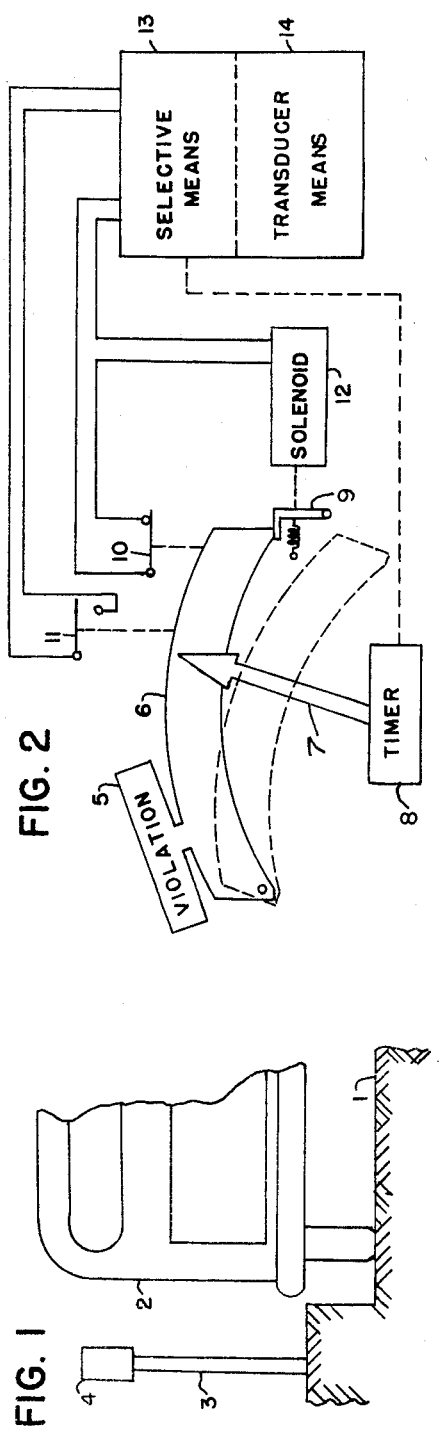
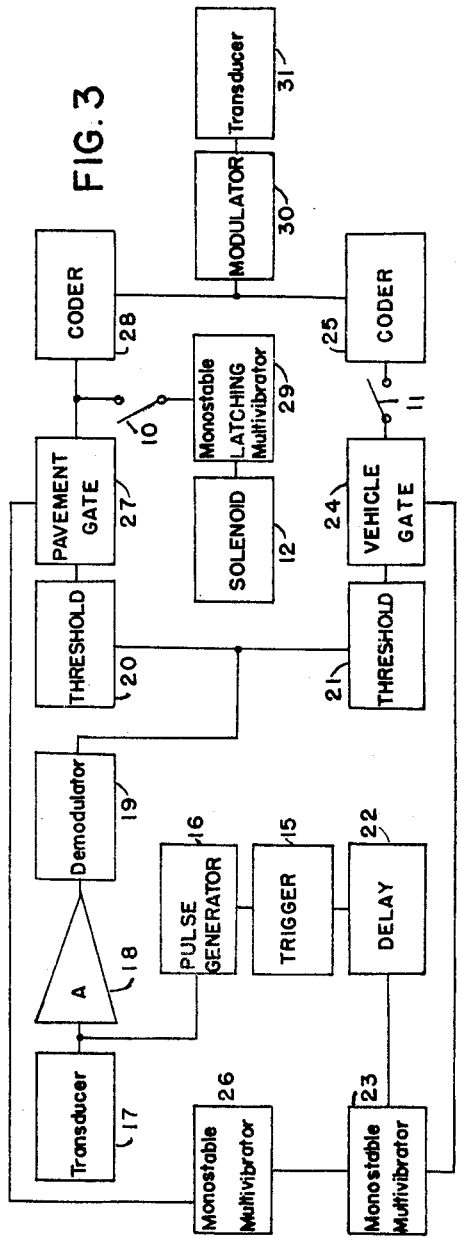

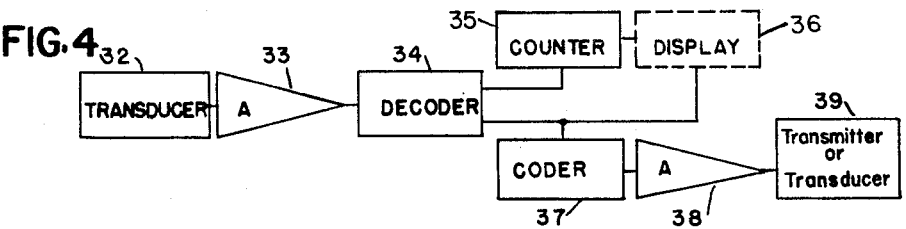
FIG. 4
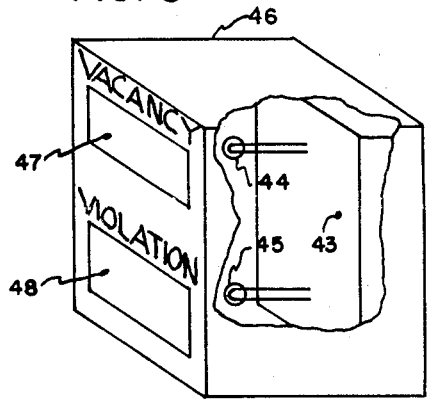
FIG. 5
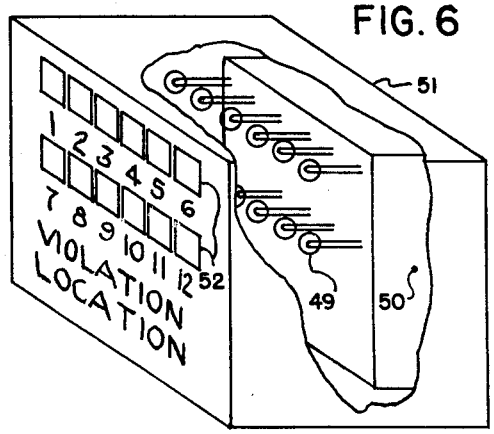
FIG. 6
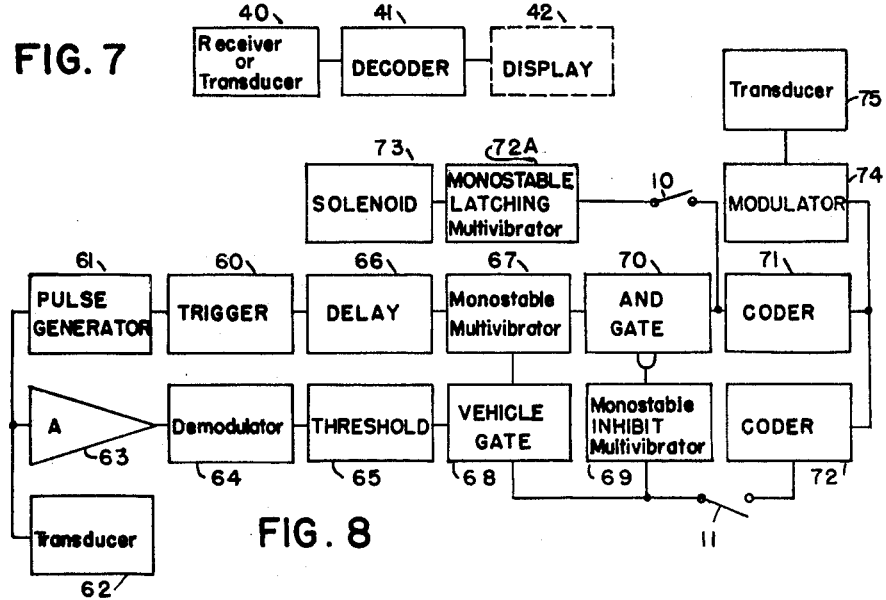
FIG. 7
FIG. 8

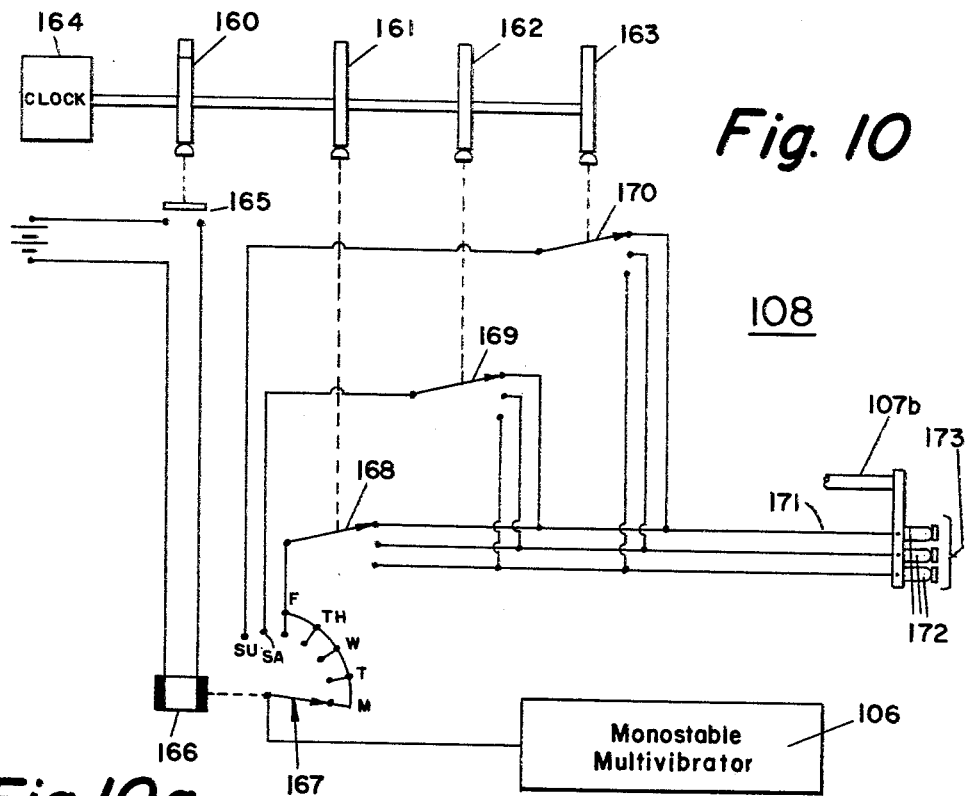
Fig. 10
Fig. 10a
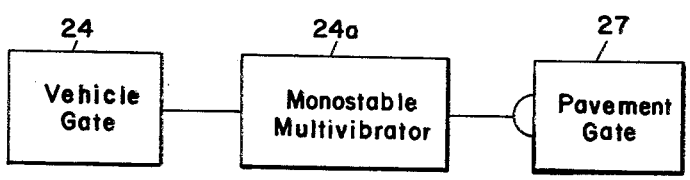
Fig. 12
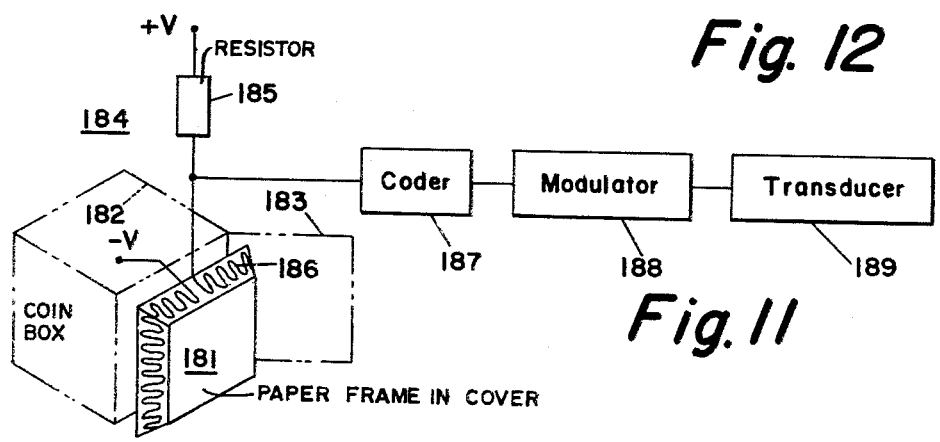
Fig. 11

United States Patent Office 3,166,732
Patented Jan. 19, 1965

3,166,732
VEHICULAR PARKING SYSTEMS
Nils Ljungman, 218 Forrest Ave., Narberth, Pa., and James E. Brown, Jr., Philadelphia, Pa. (810 Chetwynd Apts., Rosemont, Pa.)
Filed Aug. 22, 1962, Ser. No. 218,780
9 Claims. (Cl. 340—51)

This invention relates to vehicular parking systems of the sensing type and has for an object the provision of a system utilizing ultrasonic energy to sense the presence and absence of vehicles in a parking space both during and after the expiration of the parking time as indicated on a parking meter. Presently, non-sensing parking meters, that is, meters without any way of detecting the presence of a vehicle next to them, are losing a great deal of revenue due to the fact that when a space has been paid for by a motorist, it can be occupied by another vehicle without any extra fee being paid. A great deal of the traffic congestion in city areas is self-generating, that is, when congestion exists, cars are forced to cruise around looking for a vacant parking space thereby to congest the area even more.

In most commercial areas, regulations exist to limit the total time allotted to one motorist, at any one space to increase turnover. Presently, persons employed in such areas utilize approximately 40% of available spaces for all day parking. To curtail this abuse of the parking spaces, the police must record every license number at regular intervals and check for violators.

In congested areas, at present the enforcement of violations is only possible with policemen or women on foot or in motor vehicles who must look at each meter individually to observe if the small red violation flag is visible. This is expensive and wasteful of police time.

Though a number of sensing parking meters have been developed, none appears very practical. Some of these meters have a magnetic sensing device which detects the presence of a vehicle in the proximity of the meter. This system is unreliable because it can be disturbed by the great variety of electrical and magnetic signals found in cities and generated by power lines, generators, trolleys, etc. By installing a complex integrating memory circuit, the reliability of the magnetic systems can be improved. However, the cost appears prohibitive. Moreover, a magnetic system is easily tampered with by use of a permanent magnet in the vicinity of the magnetic sensing elements. The suspension of the magnetic sensing device is also very sensitive and hence subject to street vibrations. It can become inoperable very easily.

Another class of sensing meters uses the photoelectric cell. The light sensing parking meters are divided into two groups: one which transmits a beam to a photocell which is broken by the vehicle and another, a passive system, which is dependent upon incident light being blocked by the vehicle, as this is the only way this system could detect the presence of a vehicle. Either photocell system is made easily inoperable by ice or snow or grime obstructing the photocell or light source. The passive system, by its nature, must operate over a very large range of light, e.g. from dark to light, from noon to midnight. In the passive system, a complex system could be devised to circumvent this difficulty but at great expense and with poor reliability. These light sensing systems are sensitive to dirt and grime which cover most cities. Pranksters can easily cover the photocells or light source with paper, gum, etc., making them inoperable. The pranksters could also use a flashlight to make the meters register vacant.

Still another class of sensing parking meters has pressure sensitive switches embedded in the pavement. This system is expensive to install and is prone to wear and contact trouble.

In accordance with the present invention, the presence or absence of a vehicle in a parking area is at all times detected by directing into that parking area a succession of ultrasonic pulses. Ultrasonic energy directed into the parking area will be reflected back to a transducer, preferably located within the parking meter housing, either from the vehicle itself or from the vehicle roadbed. Thus, with a series of time-spaced pulses of ultrasonic energy with the time intervals therebetween providing receiving intervals, there will be known whether or not the vehicle is present or whether or not the echo has been received after a longer time interval from the more distant roadbed. If a vehicle departs prior to the expiration of the time on the parking meter, a tripping circuit is provided so that the parking meter is again set to time zero. This means a substantial saving for a city or a township in that as soon as vehicles depart from a parking area, the meter is reset to zero and in readiness to receive additional payment for the subsequent vehicle utilizing the parking space. Where traffic is congested, it is desirable that signals be provided for oncoming motorists to tell them in which street there will be a parking area vacant. Thus, as each meter is set to time zero by the selective response of the ultrasonic energy from the parking area, a transducer or transmitter will direct to a signaling device, suitably located on the pole supporting a traffic light or other convenient support, an indication that there will be one or more parking areas available in the particular block. In the same way, the presence of a signal from a parking area after the meter has expired, and with the vehicle present, can be utilized for energization of a transmitter to signal to the aforementioned convenient support or to a central location an indication that there is a parking violation. This will aid greatly in the policing of parking areas and by further avoidance of congestion due to parking violations.

A limiting mechanism is provided which prevents the addition of time to the meter beyond the meter-specified limit while the vehicle occupies the parking space.

Until the past few years transducers of high acoustical/electrical (acoustical units/volt) efficiency have been unattainable for commercial applications. Rochelle salt with a high efficiency has been attainable but it is soluble in water and thus not commercially feasible especially where a unit is exposed to the elements of weather. Quartz, another piezoelectric transducer, has low acoustic efficiency requiring very high voltages, up to the range of kilovolts to radiate an ultrasonic signal which is practical.

Magnetostrictive transducers are limited primarily in frequency range. The highest frequencies are not much above 25–35 kc. without a great drop of acoustic efficiency. Electromechanical resonances above the lowest ultrasonic range are very difficult if not impossible to obtain.

During the past few years such materials as lead zirconate titanate with very high acoustic efficiency within a wide range of ultrasonic frequencies have been developed and marketed as ultrasonic transducers. Unlike the Rochelle salt, they are not soluble in water. With ultrasonic transducers of lead zirconate titanate, low voltages are practicable. Therefore, battery operation of the entire circuitry is feasible which reduces installation costs appreciably. Otherwise, with a power mains system, a line must be connected from each meter to the sixty-cycle power lines and then rectified (or a special D.C. line installed) to provide power for transistor or tube circuitry.

Piezoelectric ultrasonic transducers of barium titanate, which has a slightly lower acoustical efficiency than lead zirconate titanate, are available which propagate a cone of ultrasonic energy with an apex as small as six degrees.

As the roadbed is not perfectly smooth and the ultrasonic beam is at an angle to a line normal to the roadbed, a portion of the ultrasonic energy striking the roadbed is scattered back to the transducer and transduced, that is converted to an output signal.

Though it has been proposed to detect the presence or absence of a vehicle by ultrasonic means and to set a parking meter at zero upon departure of a vehicle from a parking space, such systems lack the flexibility desired in most operating areas, that is, the prevention of parking time in amount solely dependent upon the size of the coin payment. Additionally, where single coins are deposited and a second cannot be, or is not, deposited until expiration of the purchased parking time, it is nevertheless desirable to permit the vehicle to be parked in excess of the unit interval of time purchased by each coin but not in excess of a total predetermined time. To provide the foregoing flexibility, the present invention includes means operable in response to the arrival of a vehicle in the parking space to initiate the timing operation of a master control element from a position coinciding with the maximum legal parking time. Thus, a motorist who takes a chance at the outset and does not deposit a coin for a half hour, nevertheless, cannot increase the time his car may occupy the parking space over and beyond the legal limit which may exceed the time span of the meter pointer by any selected factor. Thus, in accordance with our invention, this master element may have a different initial position to correspond with the parking requirements. Thus, on Sundays and holidays the total permissible time may be four, five or ten times the time span of the meter whereas on shopping nights and other days of excessive need for parking space, the time span may coincide with, or be shorter than, that of the meter.

This application is a continuation-in-part of our application Serial No. 160,617 filed December 19, 1961 for Vehicular Parking Systems, now Patent No. 3,114,128.

For further objects and advantages of the invention and for several embodiments thereof, reference is to be had to the following description taken in conjunction with the accompanying drawings in which:

FIG. 1 illustrates a portion of a vehicle in its parking space and in association with a parking meter;

FIG. 2 diagrammatically illustrates one system of carrying out the invention;

FIG. 3 is a further diagrammatic illustration of a system which may be used in conjunction with the system of FIG. 2;

FIG. 4 is a diagrammatic illustration of a signaling device which may be used at a traffic light for displaying parking area vacancies to passing motorists and for displaying parking area violations to patrolling police;

FIG. 5 illustrates the apparatus which may be used for reception and display of violation and vacancy signals to passing motorists;

FIG. 6 illustrates the apparatus which may be used for reception and display of violation locations in local law enforcement agencies;

FIG. 7 is a diagrammatic illustration of a signaling device which may be used at a remote enforcement agency;

FIG. 8 is a further diagrammatic illustration of a modification of the invention;

FIG. 10 is a diagrammatic representation of a subsystem of FIG. 9;

FIG. 10A illustrates a typical cam of FIG. 10;

FIG. 11 is a diagrammatic illustration of a signaling device;

FIG. 12 is a further diagrammatic embodiment of FIG. 3; and

Figure 9:
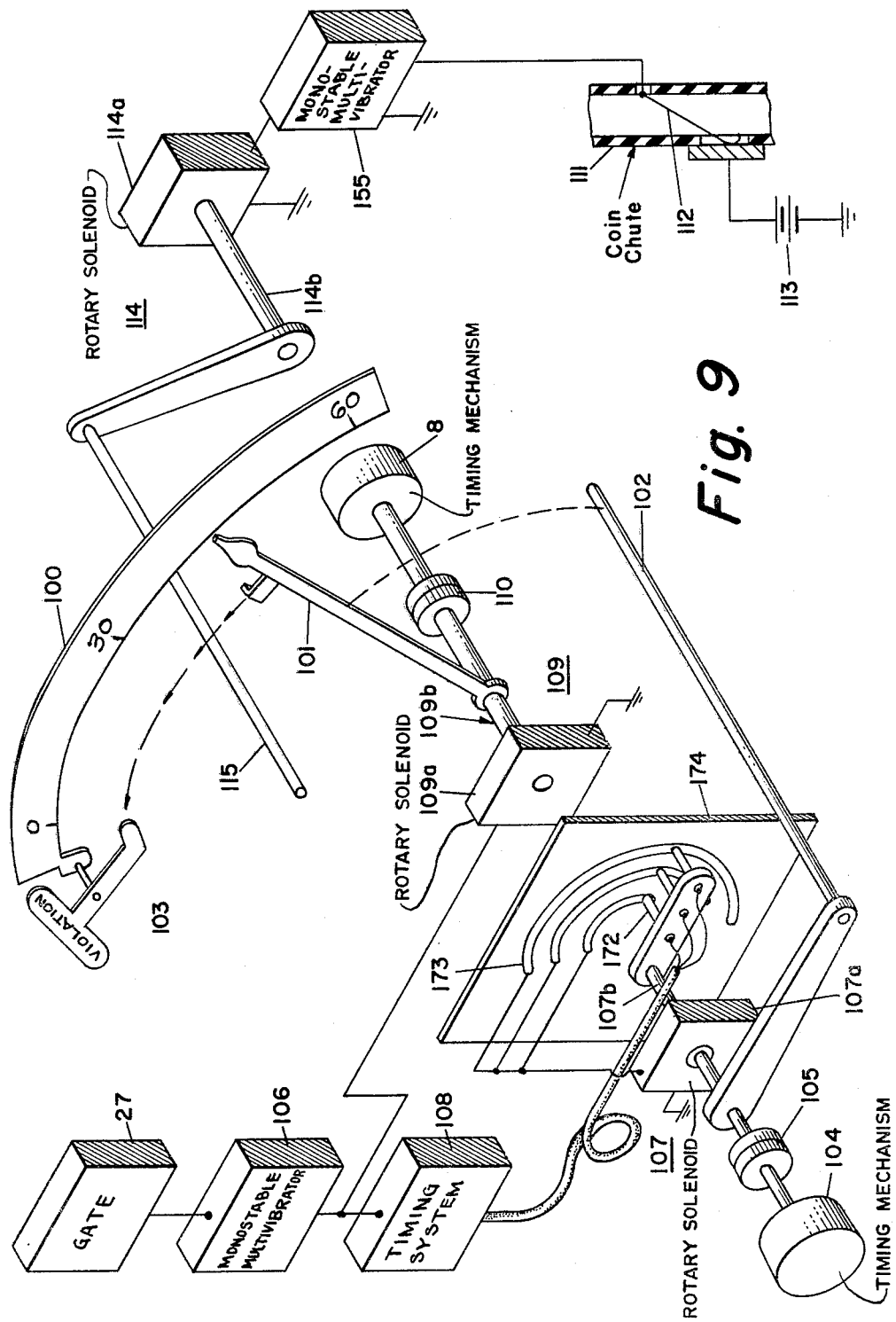
FIG. 9 is a further diagrammatic illustration of a system that is used in conjunction with the systems of FIGS. 2 and 3.

Referring now to FIG. 1, there has been illustrated a vehicle 2 parked on a roadbed 1 adjacent a curb from which there is supported on a post 3 a parking meter 4. This parking meter may be of any conventional type which is set from time zero to a predetermined interval of time which is ordinarily determined by the value of the coin inserted therein. In normal course after the selected time interval has expired, the meter trips to time zero and a violation flag 5, as shown in FIG. 2, appears.

Referring now to FIG. 2, there is illustrated a timer 8 which is set into operation for a predetermined length of time by the insertion of a coin in the parking meter. A pointer 7 indicates on time scale 6 the amount of time paid and remaining on the meter. The violation flag 5 moves into view upon tripping of the time scale 6. Selective means 13 operable by timer 8 at the end of a parking interval energizes solenoid 12 which releases catch 9 so that the violation flag 5 and time scale 6, which are integral, are drawn by gravity to the dotted line position. Switches 10 and 11 indicate electrically whether or not the violation flag 5 is displayed, that is, whether or not the violation flag 5 is in its down position. Transducer means 14 in conjunction with selective means 13 are described in detail in FIGS. 3 and 8.

In accordance with the present invention, there will be included in the housing of the meter 4 or in close association therewith a transducer 17, FIG. 3, which will be utilized for directing into the space occupied by vehicle 2 of FIG. 1 pulses of ultrasonic energy time-spaced one from the other. During the intervals between the pulses of directed ultrasonic energy, the transducer 17 will be responsive to directed ultrasonic energy reflected from the vehicle 2 of FIG. 1 and in its absence may be responsive to the energy reflected from the roadbed 1 of FIG. 1. The time required for the energy to travel from the vehicle will be much shorter than that required from the roadbed, and thus the system of FIG. 3 will discriminate between the two signals and use may be made of either or both as will be explained. To produce the train of pulses for energizing the transducer 17, there will be utilized a free running trigger or time clock 15 which applies time-spaced pulses to the pulse generator or gated oscillator 16 which in turn applies a pulse to the transducer 17 for directing the pulses of ultrasonic energy into the space occupied by the vehicle 2, as shown in FIG. 1. During the receiving interval, the transducer 17 applies to amplifier 18 and to demodulator 19 the received signal. Inasmuch as received signals can be of any amplitude, and since the origins of ultrasonic energy are various, giving rise to reflections other than those transmitted by transducer 17, there are utilized threshold devices 20 and 21. Thus, unless ultrasonic energy of minimum amplitude is received, no signals will be passed through these threshold devices 20 and 21. Advantage is also taken between the time intervals to distinguish the signals from the vehicle and roadbed. Thus, when trigger 15 applies a pulse to pulse generator 16, it also pulses a delay means 22, which may be a monostable multivibrator or a delay line. After a time interval, the delay means 22 applies a signal to the monostable multivibrator 23 which opens the vehicle gate 24. Until the gates 24 or 27 have been opened, no signals will be transmitted either to coder 25 or 28, and hence the application of pulses from the pulse generator 16 to the amplifier 18 and demodulator 19 and simultaneously to the transducer 17 does no harm since they are not passed beyond gates 24 and 27.

The spacing between the transmitted pulses will be of the order of one second though it need be but long enough to assure the round trip of the generated ultrasonic pulse over its longest travel path, i.e., from transducer to its roadbed and return. The time interval between generation of each ultrasonic pulse and its return over its shortest path (from vehicle to transducer) to the transducer is still finite and long enough to permit amplifier 18 to recover from the larger transmitted-signal and to respond to the reflected signal. The monostable multivibrator 23 having its state changed by a pulse from delay means 22 opens and holds open "vehicle" gate 24. After a predetermined interval has elapsed, monostable multivibrator 23 automatically reverts to its original stable state and closes gate 24. The reverting of monostable multivibrator 23 to its stable state produces a pulse which energizes monostable multivibrator 26 causing it to change state, thereby opening and holding open roadbed gate 27. Therefore, any signal passing gate 27 will be due to a reflection of ultrasonic energy from the roadbed during the absence of a vehicle. The roadbed signal cannot originate from the roadbed when a vehicle is present.

The monostable multivibrator 26 will after a predetermined interval has elapsed revert to its stable state thereby closing roadbed gate 27. With the foregoing in mind, and with reference to FIG. 3, if a vehicle is present in the parking area of FIG. 1, the reflected ultrasonic energy will cause the transducer 17 to generate a pulse which will pass through the vehicle gate 24. If switch 11 is closed, the coder 25 will modify the signal and apply it to modulator 30 whereupon it will energize transducer 31 which will issue an ultrasonic signal whose nature will signify a violation. As shown in FIG. 2, the aforementioned switch 11 will be closed whenever the parking space is unoccupied or the meter times out. The switch 11 is actuated at the time the violation flag 5 is automatically displayed. As will be explained, the flag 5 is also automatically displayed whenever the vehicle 2 leaves the parking space.

In a similar manner, if a vehicle be not present a signal will pass through roadbed gate 27 whereupon it will be modified by coder 28 and will energize a modulator 30 and a transducer 31 as a vacancy signal. The aforementioned signal from gate 27 will, if switch 10 be closed, energize solenoid 12 which will act to display flag 5 of FIG. 2. Switch 10 is closed when the meter of FIG. 2 is put into operation and opens when the violation flag 5 is displayed.

We now have at transducer 31 either a violation or a vacancy signal which can be distinguished from each other. The coders 25 and 28, as shown in FIG. 3, and coders 71 and 72, as shown in FIG. 8, can be constructed in a multiplicity of ways. One such coder is comprised of a monostable multivibrator which energizes modulator 30, as shown in FIG. 3, which in this case will be a pulse generator. The monostable multivibrator 25 energizes the pulse generator 30 for a predetermined time interval. By having different intervals of time of the unstable states of the two coders, monostable multivibrators 25 and 28, as shown in FIG. 3 (71 and 72 as shown in FIG. 8) signals of different duration are transmitted to the central location where these signals on a time basis can be easily distinguished by the decoder 34, as shown in FIG. 4. Decoder 34 consists of a demodulator and an integrator which integrates the envelope of pulses received from amplifier 33. If the integrated value exceeds a predetermined magnitude, the signal represents a violation. If it does not, the signal represents a vacancy as the violation pulse is longer than the vacancy pulse. Two Schmitt triggers in the decoder 34 are used to determine the magnitude of the integrated signals. The Schmitt triggers are interconnected so that the violation Schmitt trigger inhibits the vacancy output from decoder 34 so that a violation is not counted as a vacancy.

Another method applicable to the system of FIG. 3 includes coders 25 and 28 each having its own modulator 30. These modulators oscillate at different frequencies. A frequency sensitive decoder 34, FIG. 4, easily distinguishes between a violation at one frequency and a vacancy at another frequency.

Further in accordance with the present invention, FIG. 8, as in the case of FIG. 3, illustrates another form of the transducer means 14 and the selective means 13 of FIG. 2. In the same manner as FIG. 3, a free-running trigger or time clock 60 applies time-spaced pulses to the pulse generator 61 which in turn applies time-spaced pulses to the transducer 62 for directing pulses of ultrasonic energy into the space occupied by the vehicle 2, as shown in FIG. 1. During each receiving interval, the transducer 62 applies to amplifier 63 and to demodulator 64 the received signal. Inasmuch as received signals can be of any amplitude and since the origins of ultrasonic energy are various and, therefore, will be other than reflections of those transmitted by transducer 62, there is utilized a threshold device 65. Thus, unless ultrasonic energy of minimum amplitude is received, no signal will be passed through threshold device 65. When trigger 60 applies a pulse to pulse generator 61, it also pulses delay means 66 which, after a time interval, applies a signal to a monostable multivibrator 67 which opens "vehicle" gate 68. The monostable multivibrator 67 having its state changed by the pulse from delay means 66 opens and holds open "vehicle" gate 68. After a predetermined time interval has elapsed, monostable multivibrator 67 automatically reverts to its original stable state and closes "vehicle" gate 68.

With the foregoing in mind and with reference to FIG. 8, if a vehicle 2, as shown in FIG. 1, is present in the parking space, the reflected ultrasonic energy will cause the transducer 62 to generate a pulse which will pass gate 68. If switch 11 be closed, the coder 72 will modify the signal and apply it to the modulator 74 whereupon it will energize transducer 75 which will issue an ultrasonic signal whose nature will signify a violation. The signal from the "vehicle" gate 68 signifying the presence of a vehicle is applied to the monostable inhibit multivibrator 69 which causes it to change state and inhibit "AND" gate 70 so that no signals will be passed through "AND" gate 70. If no vehicle be present, there will be no signal returned that will be of sufficient magnitude to pass threshold 65 and "vehicle" gate 68. Therefore, monostable inhibit multivibrator 69 will not be energized and no inhibit will be put on "AND" gate 70. When and only when monostable multivibrator 67 reverts to its stable state can a pulse be transmitted to "AND" gate 70 which is open because of the lack of an inhibit signal from monostable inhibit multivibrator 69. The pulse from monostable multivibrator 67 is, therefore, transmitted through "AND" gate 70 and when switch 10 is closed energizes monostable latching multivibrator 72A which energizes solenoid 73 for a sufficient time to allow violation flag 5 and scale 6, as shown in FIG. 2, to fall to the dotted position. The pulse from "AND" gate 70 passes through coder 71 where it is modified to denote a vacancy and applied to modulator 74 which energizes transducer 75 as a vacancy signal.

As a further embodiment of the invention and with reference to FIG. 4, when the ultrasonic violation and vacancy signals are transmitted from transducer 31 or 75, as shown in FIGS. 3 and 8, these ultrasonic signals will be received by transducer 32 which will generate a signal which will be applied to amplifier 33 and decoder 34 which differentiates between violation and vacancy signals. The vacancy signals are applied to a counter 35 wherein the number of vacancies are counted and then applied to a display means 36 where the presence of a vacancy or the number of vacancies in an area can be presented for viewing by passing motorists. The violation signals from decoder 34 are applied to coder 37 and display means 36. The violation signals are coded in coder 37 to designate the area of the violation, then applied to amplifier 38 and relayed by transmitter or transducer 39 to a receiver 40, as shown in FIG. 7. The violation signals from decoder 34 are also applied to display means 36 where they can be displayed for viewing. The display means 36 may be of the type shown in FIG. 5 where the various components of FIG. 4 are housed in 43. The arrangement of FIG. 5, for convenience, provides for the display of singular violations and vacancies. Provision is made for display of all vacancies by counter 35, as shown in FIG. 4. Referring again to FIG. 5, a signal is applied to light 44 by counter 35 and a signal is applied to light 45 by decoder 34. Visual observance of the lights 44 and 45 (shielded one from the other by a dividing wall not shown) is provided by openings 47 and 48 in housing 46. Housing 46 will be mounted on a traffic light pole or other suitable support.

As a further embodiment of the invention and with reference to FIG. 7, reception of violation signals from transmitter or transducer 39 in FIG. 4 is accomplished by receiver or transducer 40. A signal is generated by receiver or transducer 40 which is applied to decoder 41 which applies a signal to its proper output in display 42. Since the signals applied to decoder 41 where previously coded by coder 37, as shown in FIG. 4, to designate the area of violation occurrence, decoder 41 will be able to choose the proper lamp to lights 49 to coincide with the area designations 52 as shown in FIG. 6. Referring to FIG. 6, all the component parts of FIG. 7 will be located in housing 50 from which decoder 41 of FIG. 7 there will be applied a signal to one of the various lights 49, which light will be observed through windows 52 of housing 51.

In a further preferred form of the invention, FIG. 9, we provide in association with a pointer or timing element 101 of a parking meter, the time-controlled member 102, a part of which is movable in a path which includes the path of movement of the pointer or element which controls the disposition of the flag 103 and/or other structure which signals the occurrence of a violation. The time-controlled following member 102 limits the extent to which the parking meter may be set to initiate a new timing period.

Though the following member 102 may normally be more closely associated with the pointer 101, it has in FIG. 9 been illustrated in a relatively remote angular position corresponding with a time interval of two hours. Thus, while the scale 100 provides for a sixty minute parking, the legal time as posted on the meter may be for two or more hours. Thus an owner may obtain his first sixty minutes with a first coin and later if he desires, obtain sixty more minutes. Under such circumstances it will be noted that the time-controlled member 102 will in the first hour bring its structure to the position corresponding to the sixty minute position of pointer 101 and during the second hour the member 102 will traverse the path of movement of pointer 101. It is in this manner that there is established the two-hour limit parking regardless of the number of coins inserted into the meter.

With the above in mind, it will be seen that after the meter times out from its position in FIG. 9, the owner has the option of removing the vehicle or inserting a further coin to make advantage of the additional period remaining on the meter. However, if he decides to take a chance and does not insert the coin until an hour and a half after the insertion of his first coin, it will be seen that the member 102 will then be at the thirty minute position and thus the owner cannot by delay, increase the parking time beyond the two hours since the pointer 101 is then moved only to the thirty minute position.

As to the particular structure utilized to accomplish the foregoing operations, it is to be understood there are many parking meters now available on the market and that each of them will have its mechanism modified to meet the foregoing objectives. For example, with a parking meter such as disclosed in Ellison Patent No. 2,656,908, it becomes a relatively simple matter to add the time-controlled following member 102 and to have associated with it a second timing mechanism 104 which, through a high torque friction clutch 105, drives the following member 102 at all times in a counterclockwise direction in the manner just described.

More particularly, the time-controlled member 102 is mounted for rotation about the same axis as the pointer 101 and through the timing mechanism 104 and the high torque friction clutch 105 will be urged in the counterclockwise direction in the presence of a vehicle in the parking space. A pavement gate 27, more fully described in connection with FIG. 3, applies a pulse to a monostable vibrator 106, such for example as the kind described for devices 23 and 26, which thereupon closes a relay or directly applies such pulse to a high torque rotary solenoid 107 having a stationary element 107a and a movable element 107b.

It will be remembered that the generator of ultrasonic energy operates periodically and hence, in the absence of a vehicle the transducer 17, FIG. 3, will apply a succession of pulses to the gate 27 and thence to the multivibrator 106, the effect of which will be to maintain the time-controlled member 102 in its initial or zero position. However, as soon as the vehicle occupies the parking space, the gate 27 no longer responds and then the timing mechanism 104 through clutch 105 rotates the movable element 107b and the time-controlled member 102 in the above described counterclockwise direction to initiate the limiting effect on the total parking time for the vehicle quite apart from the insertion into the meter at that time of a coin to provide legal parking. Thus there is circumvented any election by a motorist to take a calculated risk to delay the insertion of the first coin until some time after parking his vehicle.

In the above description, it has been tacitly assumed that the circuit to solenoid 107 was completed through the timing system 108 through its effect on the operation has not yet been described. Remembering that there is an output at the monostable multivibrator 106 whenever there is an absence of a vehicle in the parking space, attention will now be given to the operation of the rotary solenoid 109 having a stationary part 109a and a movable part 109b. The operation is similar to that of solenoid 107 except in this instance the timing mechanism 8 forming a part of the parking meter itself operates through a very low torque friction clutch 110, constantly to drive the movable member 109b and the pointer 101 in a counterclockwise direction and toward its zero position. Whenever there is an absence in the parking space of a vehicle, then it will be seen that the rotary solenoid 109 will be energized from the monostable vibrator 106 and the movable sections 109b will be rotated in the counterclockwise direction to bring the pointer 101 to its zero position and to actuate the alarm violation indicator 103.

There remains to be described the more or less conventional operation of the meter upon the insertion of a coin. When a coin is inserted into coin chute 111, it slides down and depresses conducting spring or brush 112, thereby interrupting the circuit from the source 113, shown as a battery. The interruption of the circuit to the monostable multvibrator 155 causes it momentarily to assume its second or astable state for application of an output pulse to the low torque rotary solenoid 114. This solenoid, thereby energized, moves its rotary portion including shaft 114b to rotate the arm 115 connected to its in a clockwise direction and to engage the pointer 101 to rotate it in a clockwise direction. The pointer 101 is thereby moved to its full-scale position. The rotary solenoid 114 rotates pointer 101 through the arc of the time scale 100 after receiving said energizing pulse.

If a motor vehicle has occupied the parking space for a sufficient time to allow the time-controlled member 102 to be in the path of pointer 101, then as low torque solenoid 114 rotates pointer 101 clockwise with arm 115, pointer 101 wil make contact with time-controlled following member 102, and come to a halt because high torque friction clutch 105 connected to timer 104 will stall the low torque solenoid 114. When monostable multvibrator 155 returns to its stable state, the rotor 114b of low torque solenoid 114 wil be rotated counterclockwise by an internal spring to its initial position as shown in FIG. 9.

Referring now to FIG. 10, there will now be described a timing system 108 which includes continuous clock 164 having on its shaft a multiplicity of cams 160 through 163. Cams 161 through 163 are of the 3-level type as shown in FIG. 10a and thus serve to operate their movable contracts 168 through 170 selectively to their three positions. Cam 160 is a 2 level cam which serves to close switch 165 once during each rotation. Of course, the cams may have more or less than three levels and the switches more or less than three positions, but the three positions illustrated for cams 161 through 163 are suitable for the embodiment of the invention being described. Switch 165 activates stepping switch 166 so that wiper 167 changes its position for every rotation of the shaft and cams. Cams 161 through 163 move switches 168 through 170 to different positions as they rotate. As can be seen in FIG. 10, cam 161 with switch 168 can represent the days of the week Monday through Friday, if clock 164 rotates the cams once every 24 hours, thereby switching the output of monostable multivibrator 106 to one of the three leads which are shown connected to the three brushes 172 which are attached to rotor 107b of rotary solenoid 107 of FIG. 9.

Cam 162 is a Saturday cam and cam 163 is a Sunday cam whose operation is essentially identical to cam 161.

Referring to FIG. 9, brushes 172 mounted on rotor 107b respectively make electrical contact with the three incomplete concentric circular bands 173 which are electrically insulated from their stationary mounting board 174. These bands in turn are electrically connected to the operating coil or to the rotary solenoid stator 107a.

As monostable multivibrator 106 pulses timing system 108, as by applying a pulse to movable contact 167, one of the switches 168 through 170 will lead said pulse to, for example, that brush of brushes 172 which is in contact with the outermost band of bands 173, FIG. 9. Therefore, high torque solenoid 107 will be energized and its rotor 107b will rotate clockwise to the full extent of the outermost band. As the brush leaves the outermost band, the energizing circuit is interrupted. Because of high torque friction clutch 105, rotor 107b will stop abruptly when the brush is carried beyond the end of the outermost band.

The other bands and brushes operate in like manner but since the other bands have shorter arc lengths, rotor 107b will be rotated through corresponding shorter arc length.

As shown in FIG. 10, the switch 167 is in its initial position M (for Monday) and the switch 168 has completed its circuit to the innermost one of contacts 173 thus indicating that the shorter parking time for the busy time of the morning is in effect. This restricted short parking period will continue in effect until movement of cam 161 to bring its intermediate level in position to operate switch 168 to its intermediate position thus placing in effect the longer intermediate parking time. Finally, at a selected evening hour, the cam 161 operates switch 168 to complete the circuit through the outermost conducting member 173 to provide the maximum permissible parking time in the area in which the meters are located.

Since the clock 164 rotates the cam-carrying shaft once every twenty-four hours, it will be seen that the foregoing operations are repeated for the following days of the week and corresponding with positions of switch 167 labelled by the abbreviations of the days of a week. After switch 167 moves from its F or Friday position to its Sa. or Saturday position, it will be seen that the control functions are then transferred to switch 169 and that the operation will be as described above except under the control of cam 162. Cam 162 differs from cam 161 and it may differ in any desired manner. Ordinarily, parking times will be more restricted in length where in the area of the meter, traffic is heavy as in and about shopping centers. Similarly, upon transfer of the circuit to the last or Su. contact, the cam 163 may be a two level cam or a single level cam depending upon whether on a Sunday the traffic problem is uniform throughout the day or varies as in locations around theaters and other amusement places open on a Sunday.

Referring to FIG. 12 which represents a further diagrammatic embodiment of a part of FIG. 3, the output of vehicle gate 24, which is sufficiently wide to receive signals caused by reflections anywhere between the transducer and the beginning of the pavement gate 27, energizes monostable multivibrator 24a which inhibits pavement gate 27 so that no signal will be transmitted if any reflection is present in vehicle gate 24.

FIG. 11 represents a detail of a coin box 182 shown with its door open so as to reveal a stiff paper frame 181 which has a wire 186 glued to its sloping sides. Wire 186 and resistor 185 comprise a resistive circuit 184 having a separate power source connected in such a way that coder 187 is quiescent when circuit 184 is closed.

The paper frame 181 is attached to the coin box 182 in such a way that if a screwdriver, for example, is used to force the coin box door 183, the wire 186 small and fragile in character will be broken.

As can be seen in FIG. 11 this breaking of wire 186 will cause coder 187, modulator 188 and transducer 189 to be energized which will cause a vandalism signal to be transmitted from the parking meter to a corner sign 46 as shown in FIG. 5. Said corner sign then transceives said vandalism signal to the police in a manner similar to the violation transmission of FIG. 4. It will be obvious that many different methods can be employed to cause coder 187 to be energized when the coin box is broken open but not when the coin box is legally opened.

Because of the large number of ultrasonic parking meters which may be in operation in a city, the gating system is open for the shortest time possible and a threshold gate is provided to suppress spurious signals from other meters. By choosing an ultrasonic frequency above 80–100 kc./s., the attenuation of our ultrasonic signal in air will be very much greater than in the 25–80 kc./s. range where there is inappreciable absorption of the ultrasonic energy by the air. Above 80–100 kc./s., the air absorbs ultrasonic energy very appreciably and this phenomenon increases into the megacycle range where resonance of the diatomic molecules in air takes place and another phenomenon occurs. However, our range of interest lies from 100 kc./s. to hundreds of kc./s. In this range a frequency is chosen which gives adequate propagation characteristics for the short range to the motor vehicle and roadbed but which is attenuated (db/meter) very strongly so that all spurious signals will be suppressed below the dynamic range of amplifiers 18 and 63 and gates 20 and 21. In this manner, threshold devices 20, 21 and 65 can be eliminated since the air at ultrasonic frequencies over 100 kc./s. attenuates greatly all signals from a distance greater than a few feet. Another advantage inherent with a higher frequency is an ultrasonic transducer 17 and 62 of smaller physical dimensions which compresses the size of our entire unit making it more easily installed in already existing parking meter equipment on the streets of cities and townships today.

It is to be understood, of course, that the system diagrammatically shown in FIGS. 3, 4, 7 and 8 may be modified as desired. Those skilled in the art are familiar with the various circuits indicated by the labeled boxes of FIGS. 3, 4, 7 and 8. For example, in "selected Semiconductor Circuits Handbook," edited by Seymour Schwartz, Wiley, 1960;

"Pulse and Digital Circuits" * by Jacob Millman and Herman Taub, McGraw-Hill Publishing Company—1956;

"Wave Generation and Shaping" by Leonard Strauss, McGraw-Hill—1960;

Military Standardization Handbook, "Selected Semiconductor Circuits," Mil–HdBK–215, June 15, 1960, Superseding Navships 93484, there will be found a multiplicity of examples of pulse generators, triggers, monostable multivibrators which can be easily assembled together as illustrated in FIGS. 3, 4, 7 and 8 and for the purposes of the present invention.

Figure 13:
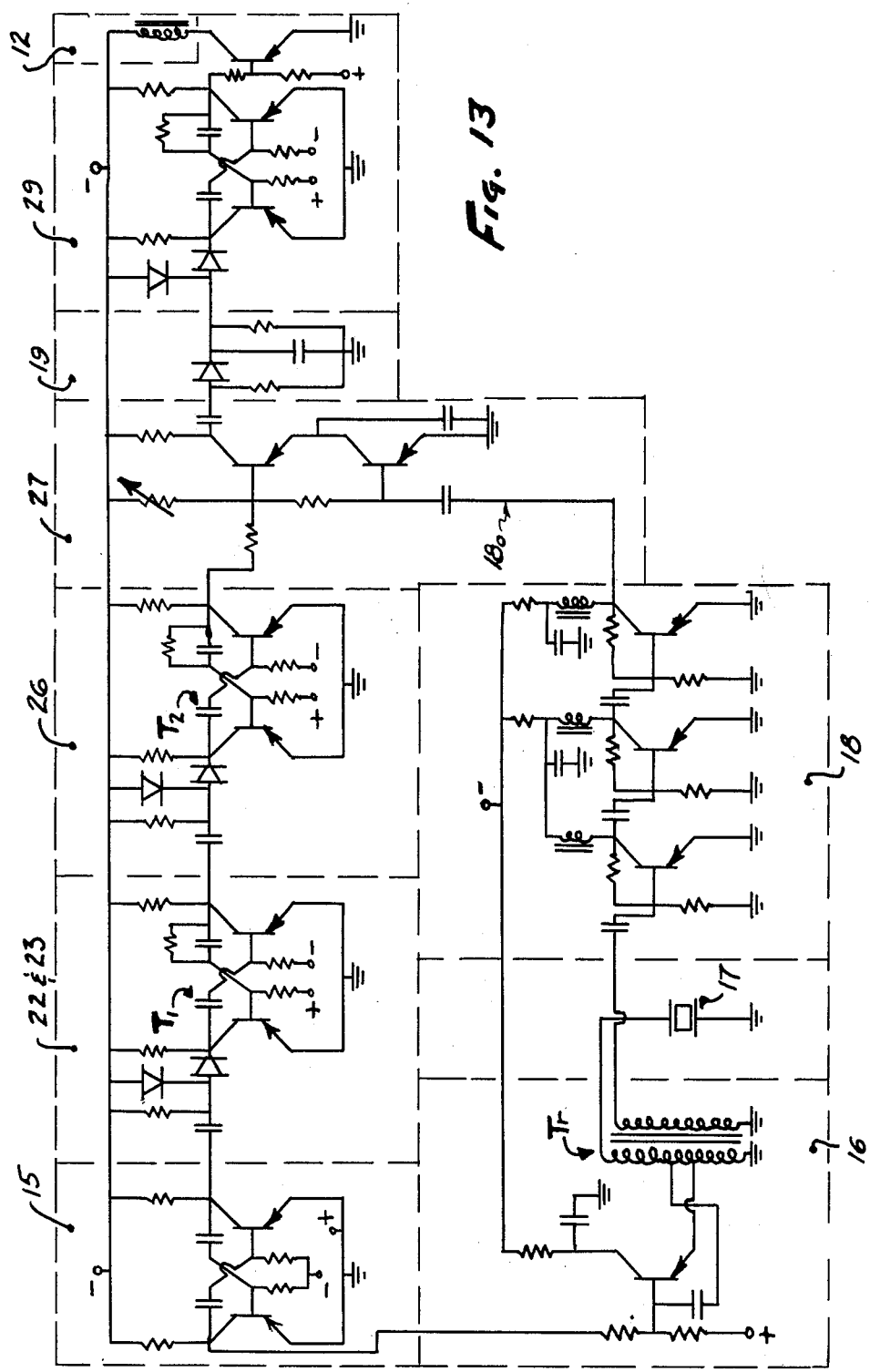
FIG. 13 is a circuit diagram of one embodiment of the invention.

In order to facilitate an understanding of the system embodying the present invention, there has been illustrated in FIG. 13 a typical wiring diagram in which the components and the several boxes are of conventional character and available from standard sources. As indicated above, these components nevertheless have been illustrated as connected together in accordance with the block diagram of FIG. 3 though simplified in that only a minimum number of individual units have been shown. Thus, for example, the trigger 15 has been illustrated as comprising a pair of cross-connected transistors with the output therefrom applied directly to a delay means comprising a monostable multivibrator which upon application of a pulse thereto is driven to its astable state. No output therefrom, however, is applied to the monostable multivibrator 26 since the diodes permit the transmittal of an applied pulse of one polarity only. Upon return of the monostable multivibrator of boxes 22 and 23 to its stable state, the output pulse is of polarity to drive the monostable multivibrator 26 to its astable state. These monostable multivibrators are both of the transistor type and include cross-connected transistors, as illustrated. The trigger 15 is also an astable multivibrator of the free running type and hence provides a succession of spaced pulses applied not only to the monostable multivibrator 22 and 23 but also to the pulse generator 16, later to be described.

The circuit components are of conventional size and are selected in terms of the type of transistors utilized in each, it being understood of course that the capacitor $T_1$ which connects the collector of one transistor to the base of the other transistor will have a size to provide the needed time delay. For example, in one modification one or two microfarads. Similarly, the corresponding capacitor $T_2$ of multivibrator 26 may have a capacity of one tenth microfarad. The output from multivibrator 26 is applied to the input transistor of pavement gate 27, which is then opened for transmittal therethrough by way of the other transistor of a signal from the output $18_0$ of amplifier 18. This output signal is then applied to the demodulator 19 and thence to the monostable latching multivibrator 29, the output of which is applied to the solenoid 12 of FIGS. 2 and 3.

As indicated above, there is derived from the free-running astable multivibrator or trigger 15 a succession of pulses applied to the oscillator 16. This causes a pulse output from the oscillator which through the coupling transformer is applied to the transducer 17. The output therefrom is then applied by way of the transformer secondary winding to transistorized amplifier 18, the output of which and its function having already been described. It is emphasized that the pulses applied to the transducer 17 for generation of ultrasonic energy come from and are stepped up by the auto-transformer formed by the connections to the primary winding of transformer $Tr$. During the time interval between the generation of ultrasonic pulses, transducer 17 can and does respond to reflected ultrasonic energy from the parking space or roadbed. An output from the transducer is applied to the primary winding of the transformer $Tr$ and is stepped up ---
\* Other sources of these conventional circuits shown by blocks herein together with their interconnections may be used.

and applied as described above to the input of amplifier 18. The transducer 17 can and does respond to reflection of ultrasonic energy from a vehicle in the parking space but since at that time the gate 27 is closed, no undesired actions take place. The foregoing facts, however, suggest that the present invention can be operated in response to ultrasonic energy from the vehicle instead of the roadbed though the operation in accordance with reflected energy from the roadbed is preferred.

In summary, it will be observed that the present sensing system in utilizing the ultrasonic energy makes it possible to use simple transistorized circuitry in the form of units of conventional type and available at relatively low cost. They are also reliable and, hence, the manner in which they will cooperate with the existing parking meters makes the present invention economically feasible with great savings to operators of parking meters by coins. Not only is there shortened the time between coins where each vehicle operator uses less than the whole of the allotted time, but there is also prompt notification of violations; and more important to the community as a whole, there is an indication to those desiring to use parking spaces of where they may be found. There is effected a greater turnover of vehicles, thereby making parking spaces more readily available.

What is claimed is:

1. The combination with a parking meter having a time-controlled element movable from a zero position through a coin-controlled path-length proportional to the value of a coin payment, of a time-controlled member movable from a maximum timing position toward a zero-timing position and having structure extending into the path of movement of said element, and means responsive to the arrival of a vehicle in a parking space for initiating movement of said member from its said maximum position, said structure of said time-controlled member in its movement in the path of said element restricting said coin-controlled movement of said element to limit the coin-controlled time-period for which said parking meter may be set to one which begins with the arrival of the vehicle in said parking space.

2. The combination of claim 1 in which there is provided detecting means responsive to the arrival of a vehicle in a parking space for setting said time controlled member to a selected maximum position and to initiate its said time travel in said path toward its zero position.

3. The combination of claim 2 in which said detecting means comprises an ultrasonic transducer for generating ultrasonic energy and directing it into a parking space and for differently responding in response to the presence or absence of a vehicle in that space.

4. The combination of claim 1 in which there are provided means responsive to reflected energy from the roadbed of the parking space in the absence of a vehicle for setting said element of said meter to its zero position and for setting said member to a maximum timing position preparatory to occupancy by another vehicle, and means for generating and directing energy onto said roadbed for reflection to said last-named means.

5. The combination with a parking meter having a time-controlled element movable through a path length proportional to the size of the coin payment, a time-controlled member having structure extending into the path of movement of said element for restricting the time period for which said parking meter may be reset to extend the initial time period, tripping means for at least one of (a) said time-controlled element to return it to zero before expiration of said parking time and (b) said time controlled member for returning it to its initial position preparatory to timing the occupancy of a parking space by a vehicle, transducing means for generating and directing ultrasonic energy pulses into the parking space monitored by said parking meter and which space may be occupied by a vehicle, pulsing means for periodically energizing said transducing means for producing said ultrasonic pulses, said transducing means being disposed to receive reflections of said ultrasonic pulses from a vehicle, an output circuit, connections including switching means between said output circuit and said transducing means for preventing output signals during generation of said ultrasonic pulses and for development at said output circuit of signals representative of reflections produced by said ultrasonic pulses, and means for operating said tripping means in response to output signals from said output circuit representative of the absence from said parking space of said vehicle before the expiration of its parking time.

6. The combination with a parking meter operable to predetermined parking time, of transducing means for generating and directing ultrasonic energy into the parking space which can be occupied by a vehicle and for receiving ultrasonic energy reflected from said vehicle and in its absence from the roadbed, selective means selectively responsive to said reflected ultrasonic energy for signaling at least one of (a) the presence of a vehicle, (b) the absence of a vehicle, means responsive to said selected means for transmitting to a central location signals indicative of the presence in, and absence of, said vehicle from said parking space, and means responsive to unauthorized opening or tampering with the parking meter to transmit that fact to said central location.

7. The combination with a parking meter having a time-controlled element movable from a zero position through a coin-controlled path-length proportional to the value of a coin payment for predetermining parking time, of transducing means for generating and directing ultrasonic energy into the parking space which can be occupied by a vehicle and for receiving ultrasonic energy reflected from said vehicle and in its absence from the roadbed of said parking space, selective means selectively responsive to said reflected ultrasonic energy for signalling at least one of (a) the presence of a vehicle, (b) the absence of a vehicle, and means for modifying the operation of said parking meter for limiting the total time a vehicle can occupy a parking space without exceeding a legally specified time comprising in addition to said time-controlled element a time-controlled member operable under the control of said selective means independently of said element from a maximum timing-position to a zero-timing position in a path which includes that of said element for limiting the extent to which said parking meter may be set to initiate timing periods followng the initiation of a first timing period, and means operable under the control of said selective means for operating said element to zero time and for operating said member to its maximum timing position after departure of a vehicle from its parking space.

8. The combination of claim 7 in which said selective means in response to the presence of a vehicle in said parking space following movement of said member to its maximum time position initiates its time-controlled movement through its said path.

9. The combination of claim 7 in which said transducing means is a single transducer which both generates and receives said ultrasonic energy.

References Cited in the file of this patent
UNITED STATES PATENTS

| | | |
|---|---|---|
| 2,217,776 | Sweetland | Oct. 15, 1940 |
| 2,571,185 | Bates | Oct. 16, 1951 |
| 2,652,551 | Gumpertz et al. | Sept. 15, 1953 |
| 3,045,909 | Auer | July 24, 1962 |